(12) United States Patent
Kimura (10) Patent No.: US 7,342,862 B2
(45) Date of Patent: Mar. 11, 2008

(54) OPTICAL DISC SYSTEM AND CONTROL METHOD THEREOF

(75) Inventor: Motoi Kimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 599 days.

(21) Appl. No.: 10/819,287

(22) Filed: Apr. 7, 2004

(65) Prior Publication Data
US 2004/0257952 A1    Dec. 23, 2004

(30) Foreign Application Priority Data
Apr. 10, 2003  (JP) .............................. 2003-106090

(51) Int. Cl.
*G11B 5/09* (2006.01)
(52) U.S. Cl. ................. 369/59.12; 369/53.26
(58) Field of Classification Search ...................... None
See application file for complete search history.

(56) References Cited

U.S. PATENT DOCUMENTS 6,188,656 B1* 2/2001 Shoji et al. .............. 369/47.25
6,359,846 B1* 3/2002 Shoji et al. ................. 369/47.5
6,671,248 B2* 12/2003 Miyabata et al. ........... 369/116
7,031,241 B2* 4/2006 Nakajo ....................... 369/53.2

* cited by examiner

Primary Examiner—Wayne Young
Assistant Examiner—Adam R. Giesy
(74) Attorney, Agent, or Firm—Oblon, Spivak, McClelland, Maier & Neustadt, P.C.

(57) ABSTRACT

An optical disc system includes a disc recording unit for recording an information signal on an optical disc by switching irradiation power of laser light to be applied to the optical disc in accordance with the information signal. The disc recording unit includes a semiconductor laser; a laser-power controlling circuit for outputting a laser-driving-current instruction signal; a recording-pulse generating circuit for outputting a laser-modulation timing pulse; a laser driving circuit for generating a laser driving current in accordance with the laser-driving-current instruction signal and the laser-modulation timing pulse; and a correction-data storage for storing as correction data the shift between the laser-modulation timing pulse and the pulse position of the laser driving current. The optical disc system further includes a controller for correcting the pulse position of the laser driving current to a desired position by correcting the position of the laser-modulation timing pulse with the correction data.

16 Claims, 11 Drawing Sheets

(a) DRIVING CURRENT

(b) COOLING CURRENT (b) ERASING CURRENT (b) PEAK CURRENT

OPTICAL DISC SYSTEM AND CONTROL METHOD THEREOF

BACKGROUND OF THE INVENTION

1. Field of the Invention

The present invention relates to optical disc systems for performing recording on an optical disc by switching irradiation power in accordance with an information signal to be recorded and to control methods of the optical disc systems. More particularly, the present invention relates to an optical disc system capable of improving the recording characteristics by improving the accuracy of the positions of recording pulses and to a control method of the optical disc system.

2. Description of the Related Art

Hitherto, various optical disc systems have been suggested for optimizing the position of laser light applied to an optical disc. Such an optical disc system is disclosed in, for example, U.S. Pat. No. 5,109,373.

Related arts for use in such optical disc systems will be described below in terms of (1) multipulse recording and generation of laser-driving-current waveforms and (2) circuit configuration of laser driving circuit and switching delay.

(1) Multipulse Recording and Generation of Laser-Driving-Current Waveforms

Figure 6:
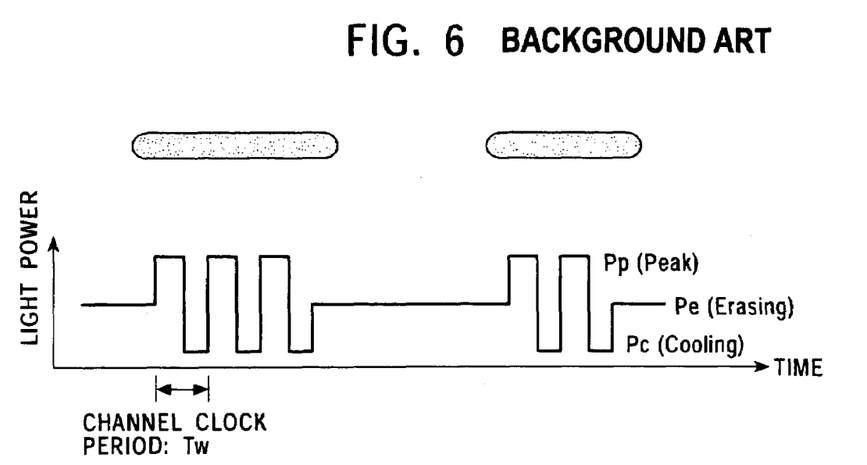
FIG. 6 illustrates an example of a laser waveform in a known multipulse recording method.

For example, a multipulse recording method as shown in FIG. 6 is used for achieving high-density recording on an optical disc. Referring to FIG. 6, light power is three-value power including peak power Pp, erasing power Pe, and cooling power Pc. The width of one pulse is about half a channel clock period. The number of output recording pulses corresponds to a mark length to be recorded.

Figure 7:
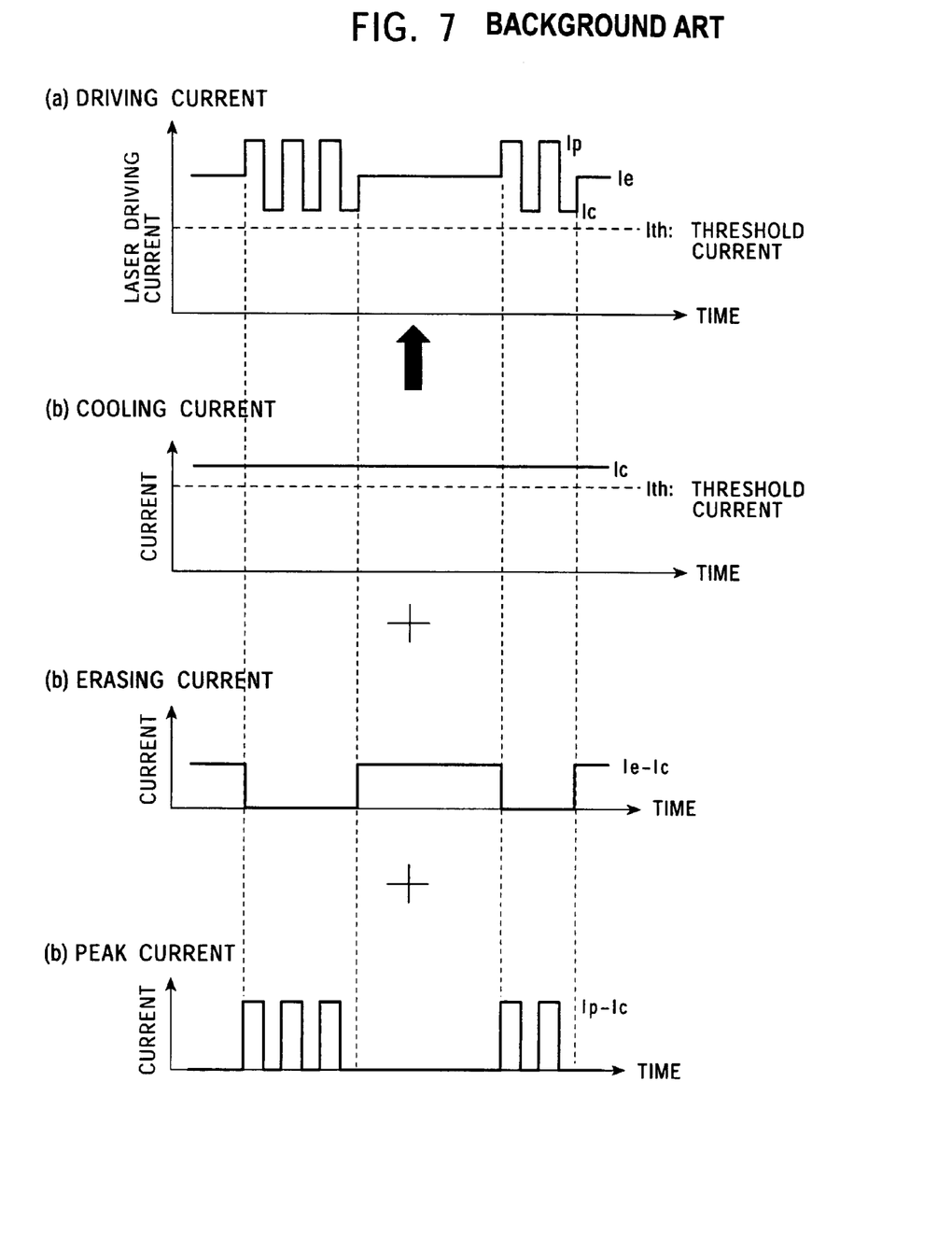
FIG. 7 is a diagram illustrating a method of generating a laser driving current in the known multipulse recording method in FIG. 6.

FIG. 7 is a diagram illustrating a method of generating the recording pulses in FIG. 6. A laser-driving-current waveform for generating the recording pulses is shown in (a) driving current in FIG. 7. A laser driving current Ip corresponds to the peak power Pp, a laser driving current Ie corresponds to the erasing power Pe, and a laser driving current Ic corresponds to the cooling power Pc.

The laser-driving-current waveform is generated by combining three channels shown in FIG. 7. Namely, a constant current Ic is generated in a cooling channel, switching of current amplitude (Ie-Ic) is performed in an erasing channel, and switching of current amplitude (Ip-Ic) is performed in a peak channel. Adding these three currents provides the laser-driving-current waveform.

(2) Circuit Configuration of Laser Driving Circuit and Switching Delay

Figure 8:
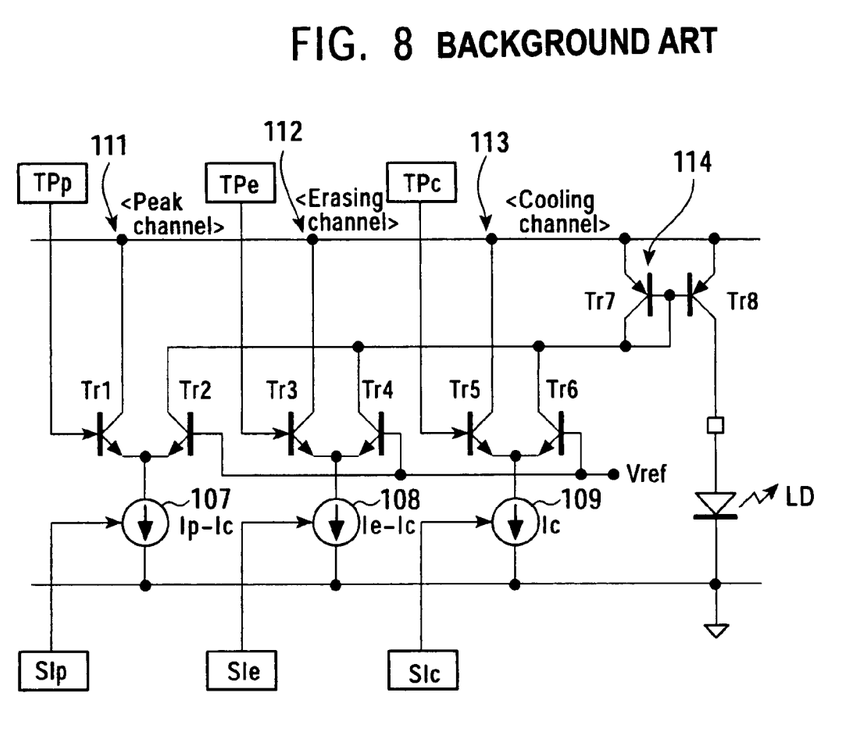
FIG. 8 is a circuit diagram showing the structure of a known laser driving circuit.
Figure 9A:
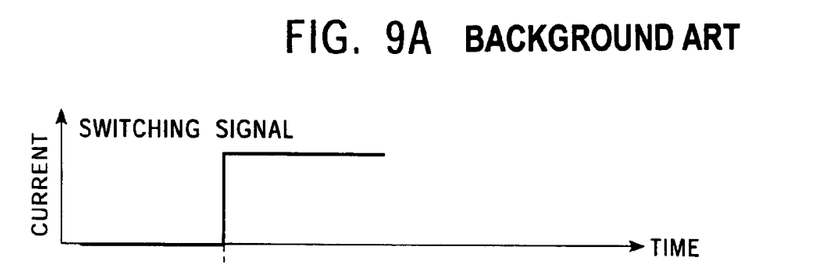
FIGS. 9A to 9D illustrate the dependence of the rising-edge delay in a known switching circuit on a switching-current amplitude.
Figure 9B:
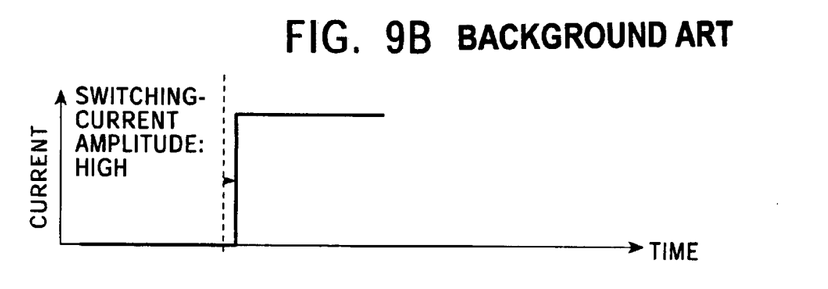
Figure 9C:
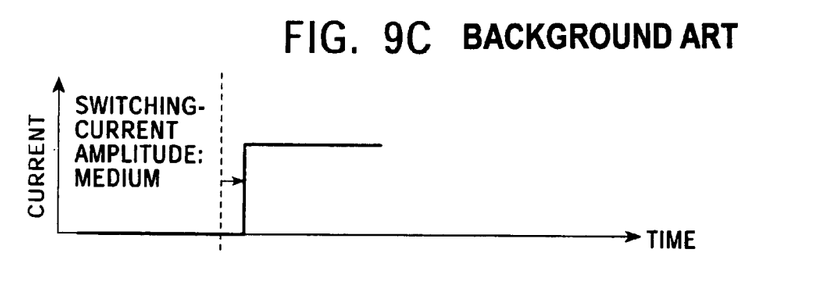
Figure 9D:
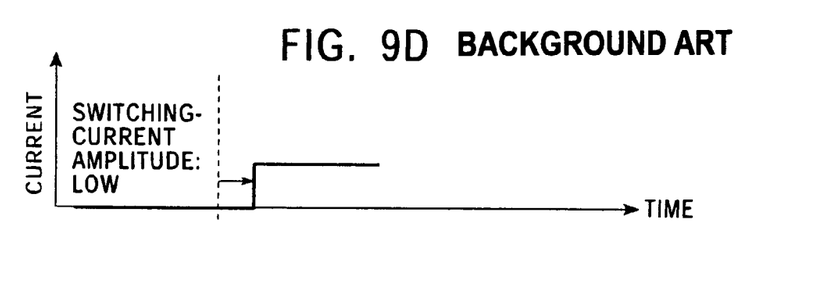

Such a laser driving current is realized in, for example, a circuit configuration shown in FIG. 8.

The circuit configuration in FIG. 8 includes three switching circuits, that is, a peak switching circuit 111, an erasing switching circuit 112, and a cooling switching circuit 113. The peak switching circuit 111 includes a pair of differential-switching transistors Tr1 and Tr2 and a current source 107. The erasing switching circuit 112 includes a pair of differential-switching transistors Tr3 and Tr4 and a current source 108. The cooling switching circuit 113 includes a pair of differential-switching transistors Tr5 and Tr6 and a current source 109. In the peak channel, the current source 107 is controlled by a laser-driving-current instruction signal SIp to supply a current (Ip-Ic). Applying a laser-modulation timing pulse TPp to the peak switching circuit 111 turns on and off the current (Ip-Ic), which is output as a collector current of the differential-switching transistor Tr2. The same applies to the erasing switching circuit 112 in the erasing channel and the cooling switching circuit 113 in the cooling channel.

The collector currents output from the three channels are supplied to a current mirror circuit 114. The supplied collector currents are added at the collector of the transistor Tr7. After the polarity of the added current is reversed by the current mirror circuit 114 in which Tr7=Tr8, the polarity-reversed current is supplied to a semiconductor laser LD as the laser driving current.

However, in such a switching operation by the transistors, the turn-off time tends to be longer than the turn-on time. As a result, a delay in the rising edge of the laser driving current occurs. Such a rising-edge delay is varied with switching-current amplitudes (corresponding to Ip-Ic, Ie-Ic, and Ic in FIG. 8), as shown in FIGS. 9A to 9D.

Figure 10:
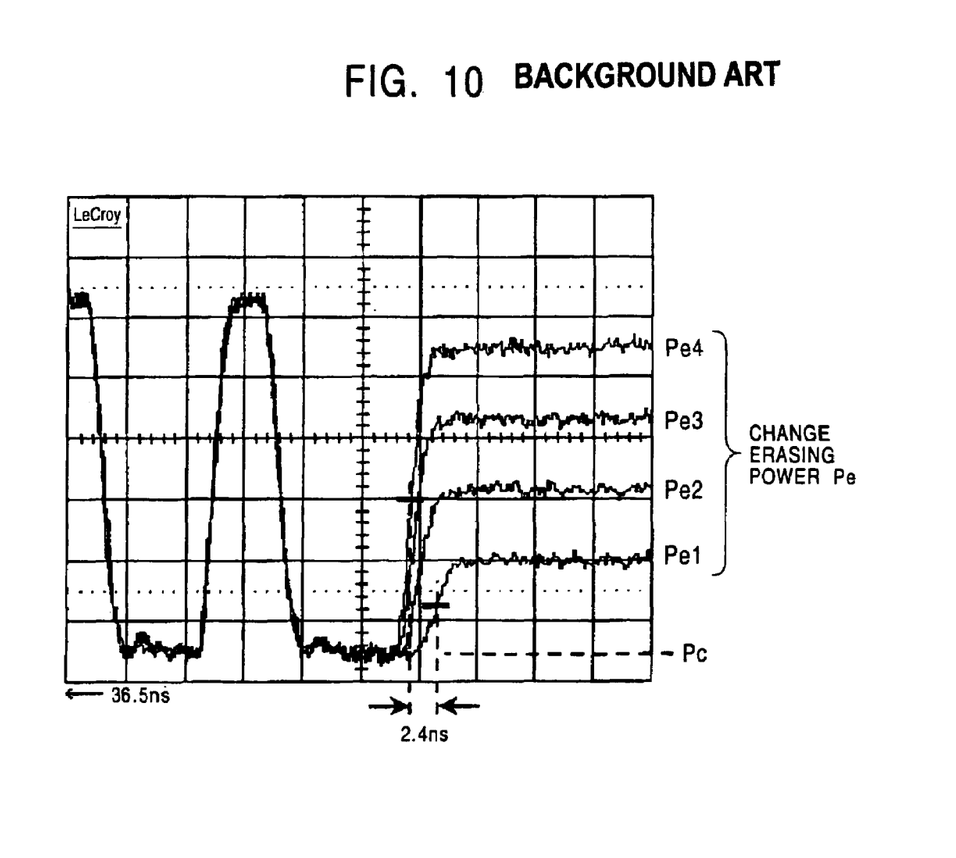
FIG. 10 shows an example of the rising-edge delay varied with the switching-current amplitude.

FIG. 10 shows an example of the rising-edge delay varied with the switching-current amplitude. This example denotes the trailing ends of record marks of the recording pulses shown in FIG. 6, in which the erasing power Pe is varied in four ways. Referring to FIG. 10, a timing of a lowest erasing power Pe1 when the recording pulse traverses an amplitude corresponding to 50% of the switching amplitude (Pe1-Pc) and a timing of a highest erasing power Pe4 when the recording pulse traverses an amplitude corresponding to 50% of the switching amplitude (Pe4-Pc) are shown. In this example, the timing of the rising edge of Pe1 is shifted from the timing of the rising edge of Pe4 by 2.4 ns, and the positions of the trailing edges of the record marks can be shifted by the same time period. The value 2.4 ns corresponds to 15% of the width of a detection window because a channel clock period Tw equals 15.15 ns for a Blu-ray disc (x1), thus easily and undesirably anticipating the deterioration of the record characteristics, such as an increase in an error rate.

Figure 11:
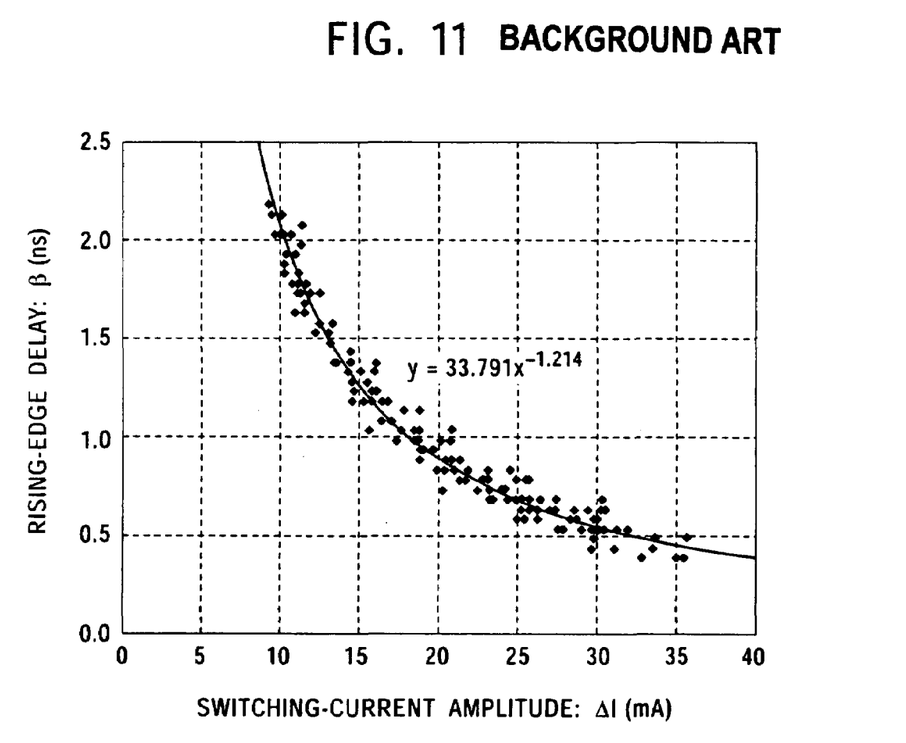
FIG. 11 shows measurement results of the rising-edge delay varied with the switching-current amplitude for multiple optical systems and multiple switching-current amplitudes.

FIG. 11 shows measurement results of the rising-edge delay of the laser driving current for multiple optical systems and multiple switching-current amplitudes. The vertical axis denotes the rising-edge delay and the horizontal axis denotes the switching-current amplitude. As shown in FIG. 11, the rising-edge delay depends on the switching-current amplitude.

Figure 12:
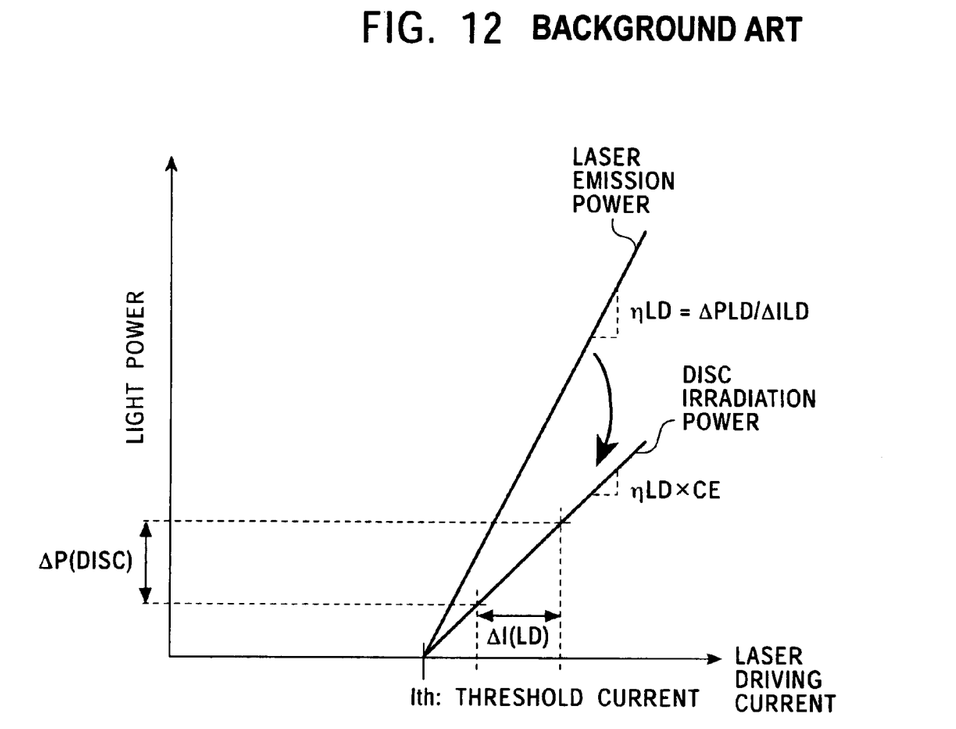
FIG. 12 illustrates two characteristics, that is, laser emission power and disc irradiation power, and an example the optical efficiency of an optical system.

The switching-current amplitude is not always the same even when the same recording power is used. This will be described with reference to FIG. 12. Referring to FIG. 12, the vertical axis denotes the light power and the horizontal axis denotes the laser driving current. Two characteristics, that is, laser emission power and disc irradiation power, are represented in FIG. 12.

The switching amplitude ΔP(DISC) of the disc irradiation power is given by equation 1.

$$\Delta P(DISC) = \Delta I(LD) \times \eta LD \times CE \qquad \text{Formula 1}$$

where $\Delta I(LD)$ denotes the switching-current amplitude of the laser driving current $I(LD)$, $\eta LD$ denotes a laser differential efficiency, and CE denotes an optical efficiency (the ratio of the laser emission power to the disc irradiation power). $\eta LD$ and CE have a great difference between individuals. In addition, $\eta LD$ varies with temperature and age. Hence, the switching-current amplitude of the laser driving current $I(LD)$ varies with individuals even with the disc irradiation power having the same switching-current amplitude being applied. As a result, the positions of the recording pulses are varied with individuals even with the same recording power, thus exhibiting the variation in the recording characteristics.

Furthermore, the optimal recording power differs depending on the recording sensitivity of media themselves, thus bringing the shift in the positions of the recording pulses and deteriorating the recording characteristics.

However, the shift in the pulse position of the laser driving current from the timing instructed by the laser-modulation timing pulse, as described above, produces the shift from the original recording pulse, thus leading to the deterioration of the recording characteristics, such as an increase in the error rate.

SUMMARY OF THE INVENTION

Accordingly, it is an object of the present invention to provide an optical disc system and a control method thereof, which are capable of suppressing the shift in the pulse position of a laser driving current from the timing instructed by a laser-modulation timing pulse to achieve stable recording characteristics.

The present invention provides, in its first aspect, an optical disc system including a disc recording unit for recording an information signal on an optical disc by switching irradiation power of laser light to be applied to the optical disc in accordance with the information signal. The disc recording unit includes a semiconductor laser serving as a light source of the laser light; a laser-power controlling circuit for outputting a laser-driving-current instruction signal such that the semiconductor laser emits a predetermined light power; a recording-pulse generating circuit for generating an appropriate recording pulse in accordance with the information signal to output a laser-modulation timing pulse; a laser driving circuit for generating a laser driving current in accordance with the laser-driving-current instruction signal and the laser-modulation timing pulse; and a correction-data storage for storing as correction data the shift between the laser-modulation timing pulse in the laser driving circuit and the pulse position of the laser driving current. The optical disc system further includes a controller for correcting the pulse position of the laser driving current to a desired position by correcting the position the laser-modulation timing pulse with reference to the correction data stored in the correction-data storage.

The present invention provides, in its second aspect, a control method of an optical disc system including a disc recording unit for recording an information signal on an optical disc by switching irradiation power of laser light to be applied to the optical disc in accordance with the information signal. The disc recording unit includes a semiconductor laser serving as a light source of the laser light; a laser-power controlling circuit for outputting a laser-driving-current instruction signal such that the semiconductor laser emits a predetermined light power; a recording-pulse generating circuit for generating an appropriate recording pulse in accordance with the information signal to output a laser-modulation timing pulse; a laser driving circuit for generating a laser driving current in accordance with the laser-driving-current instruction signal and the laser-modulation timing pulse; and a correction-data storage for storing as correction data the shift between the laser-modulation timing pulse in the laser driving circuit and the pulse position of the laser driving current. The control method includes a correction step of correcting the pulse position of the laser driving current to a desired position by correcting the position of the laser-modulation timing pulse with reference to the correction data stored in the correction-data storage.

The optical disc system and the control method thereof according to the present invention acquire a desired pulse position of the laser driving current by correcting the position of the laser-modulation timing pulse with reference to the correction data in the correction-data storage for storing the shift between the laser-modulation timing pulse in the laser driving circuit and the pulse position of the laser driving current, so that it is possible to suppress the shift in the pulse position of the laser driving current from the timing instructed by the laser-modulation timing pulse to achieve stable recording characteristics.

In addition, according to the present invention, when the shift in the pulse position of the laser driving current depends on the switching-current amplitude as in the related arts described above, correcting the position of the laser-modulation timing pulse in accordance with the switching-current amplitude can correct the pulse position of the laser driving current to a desired position.

The switching-current amplitude can be acquired from the laser-driving-current instruction signal or from the shift between the setting power supplied to the laser-power controlling circuit via the laser-power instruction signal and the stored relation of the laser driving current to the irradiation power, or can be acquired by monitoring the value of the current source of the switching circuit. With such methods, the pulse position of the laser driving current can be corrected to a desired position even with the variation in the laser differential efficiency or the optical efficiency in the optical system.

Furthermore, constantly monitoring the switching-current amplitude during a recording operation can eliminate the effect of the temperature characteristics of the laser or the like. Measuring and updating the relation between the laser driving current and the irradiation power when the optical disc system is turned on or during idling can eliminate the effect of deterioration with age.

DESCRIPTION OF THE PREFERRED EMBODIMENTS

Optical disc systems and control methods thereof according to embodiments of the present invention will be described below with reference to the attached drawings.

According to the embodiments, storing a shift in the pulse position of a laser driving current in a correction-data storing unit to correct the timing instructed by a laser-modulation timing pulse in advance corrects the shift in the pulse position in order to generate original recording pulses and to achieve stable recording characteristics.

An optical disc system according to a first embodiment of the present invention will now be described. The optical disc system of the first embodiment is the basic mode of the present invention.

Figure 1:
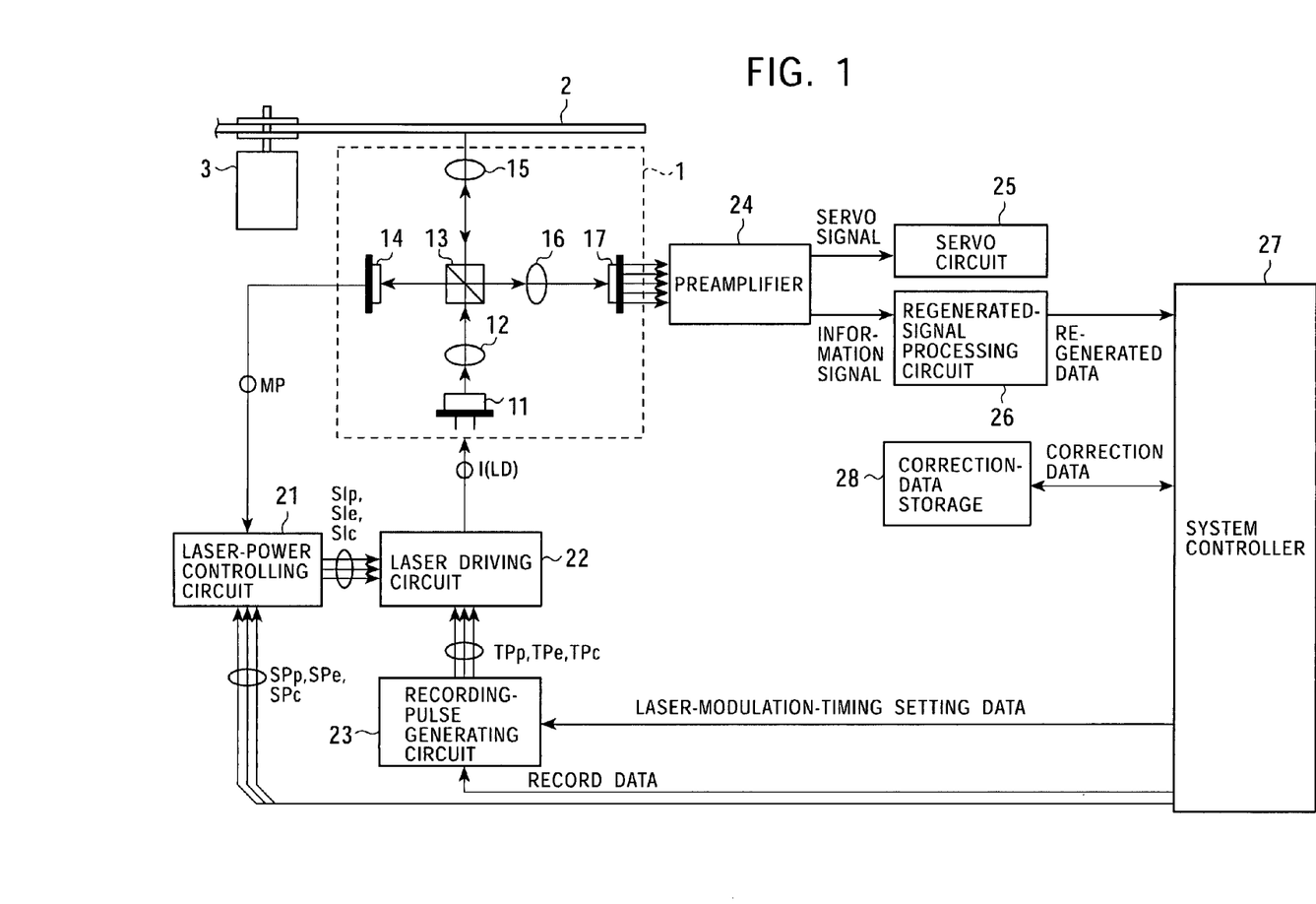
FIG. 1 is a block diagram showing the structure of an optical disc system according to a first embodiment of the present invention.

FIG. 1 is a block diagram showing the structure of the optical disc system according to the first embodiment of the present invention.

Referring to FIG. 1, light rays emitted from a semiconductor laser 11 serving as a light source are collimated by a collimator lens 12 and are incident on a beam splitter 13. The light rays reflected from the beam splitter 13 are incident on a monitor photo-acceptance unit 14, from which a laser-power monitor signal MP is output.

The light rays transmitted through the beam splitter 13 are condensed on an optical disc 2, which is rotated by a spindle motor 3, through an objective lens 15. The light rays reflected from the optical disc 2 are collimated again by the objective lens 15 and are reflected from the beam splitter 13. The reflected light rays pass through a condenser lens 16 and are incident on a signal photo-acceptance unit 17.

A current output from the signal photo-acceptance unit 17 is converted into a voltage by a preamplifier 24 to generate information signals and servo-error signals. The servo-error signals are transmitted to a servo circuit 25 to undergo focusing and/or tracking servo. The information signals are transmitted to a regenerated-signal processing circuit 26 to extract regenerated data.

The laser-power monitor signal MP is supplied to a laser-power controlling circuit 21, which controls laser-driving-current instruction signal SIp, SIe, or SIc such that the semiconductor laser 11 emits the light rays at a power in accordance with laser-power instruction signal SPp, SPe, or SPc supplied from a system controller 27. For the three-value recording pulses as shown in FIG. 6, the three laser-power instruction signal SPp, SPe, or SPc and the corresponding laser-driving-current instruction signal SIp, SIe, or SIc are processed.

Record data and laser-modulation-timing setting data (so-called "record strategy") are supplied from the system controller 27 to a recording-pulse generating circuit 23, from which laser-modulation timing pulse TPp, TPe, or TPc is output based on the supplied record data and the laser-modulation-timing setting data.

A laser driving circuit 22 generates a current in accordance with the laser-driving-current instruction signal SIp, SIe, or SIc, and turns on and off the current in accordance with the laser-modulation timing pulse TPp, TPe, or TPc. As a result, a laser driving current I(LD) is generated. A correction-data storage 28 is connected to the system controller 27.

In this structure, the shift between the laser-modulation timing pulse TPp, TPe, or TPc in the laser driving circuit 22 and the pulse position of the laser driving current I(LD) is stored in the correction-data storage 28 as correction data.

The system controller 27 transmits the laser-modulation-timing setting data corrected in accordance with the correction data to the recording-pulse generating circuit 23 in order to correct the pulse position of the laser driving current I(LD) to desired timing.

An optical disc system according to a second embodiment of the present invention will now be described.

Figure 2:
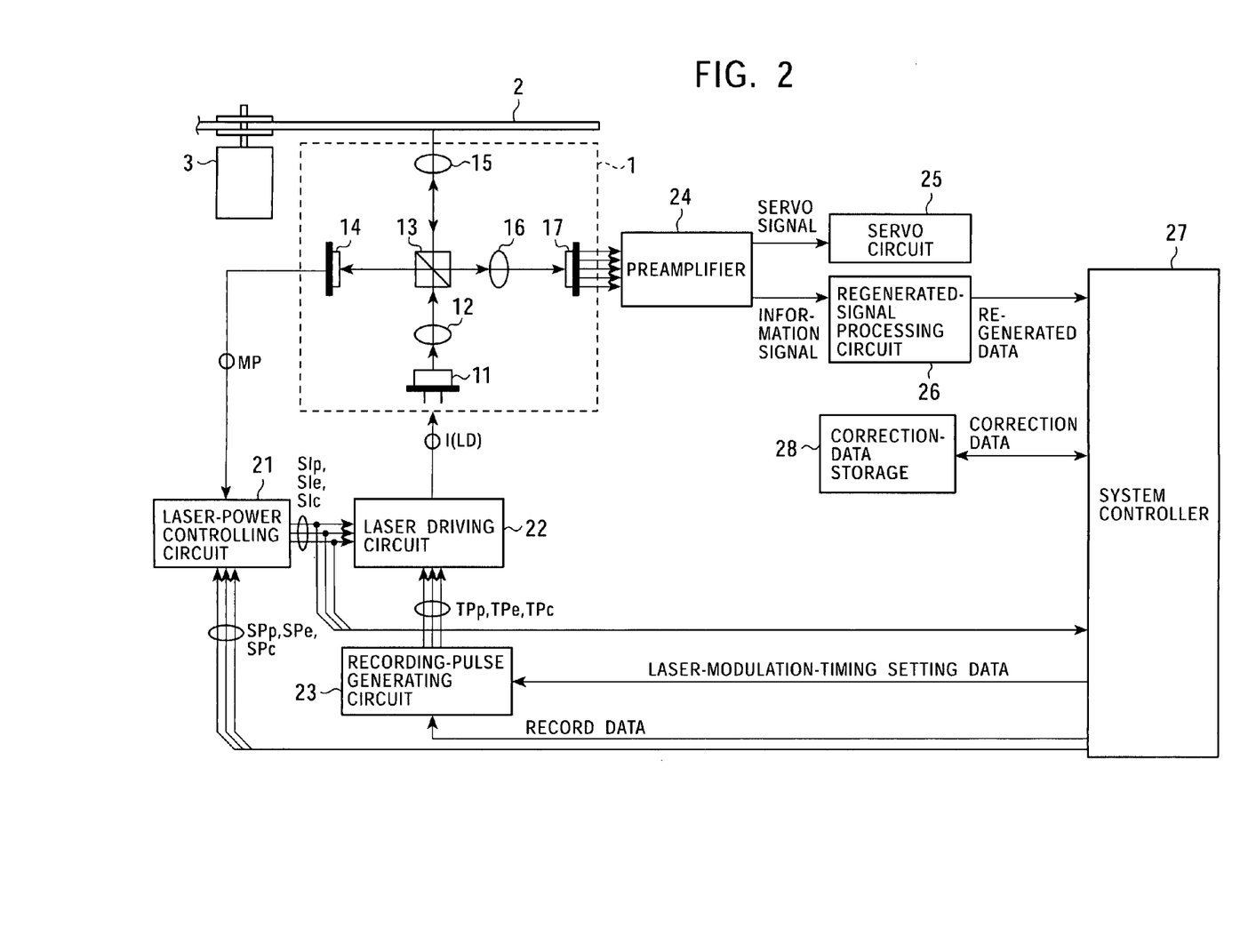
FIG. 2 is a block diagram showing the structure of an optical disc system according to a second embodiment of the present invention.

FIG. 2 is a block diagram showing the structure of the optical disc system according to the second embodiment of the present invention. The optical disc system of the second embodiment differs from the optical disc system of the first embodiment in FIG. 1 in that the laser-driving-current instruction signal SIp, SIe, or SIc is also transmitted to the system controller 27. The correction-data storage 28 stores the relation between the switching-current amplitude and the pulse-position shift as shown in FIG. 11.

In this structure, the system controller 27 acquires the switching-current amplitude from the input laser-driving-current instruction signal SIp, SIe, or SIc. The system controller 27 acquires the shift between the laser-modulation timing pulse TPp, TPe, or TPc in the laser driving circuit 22 and the pulse position of the laser driving current I(LD), from the switching-current amplitude and the correction data. The laser-modulation-timing setting data that has been corrected in accordance with the shift is transmitted to the recording-pulse generating circuit 23 in order to correct the pulse position of the laser driving current I(LD) to desired timing.

An optical disc system according to a third embodiment of the present invention will now be described.

Figure 3:
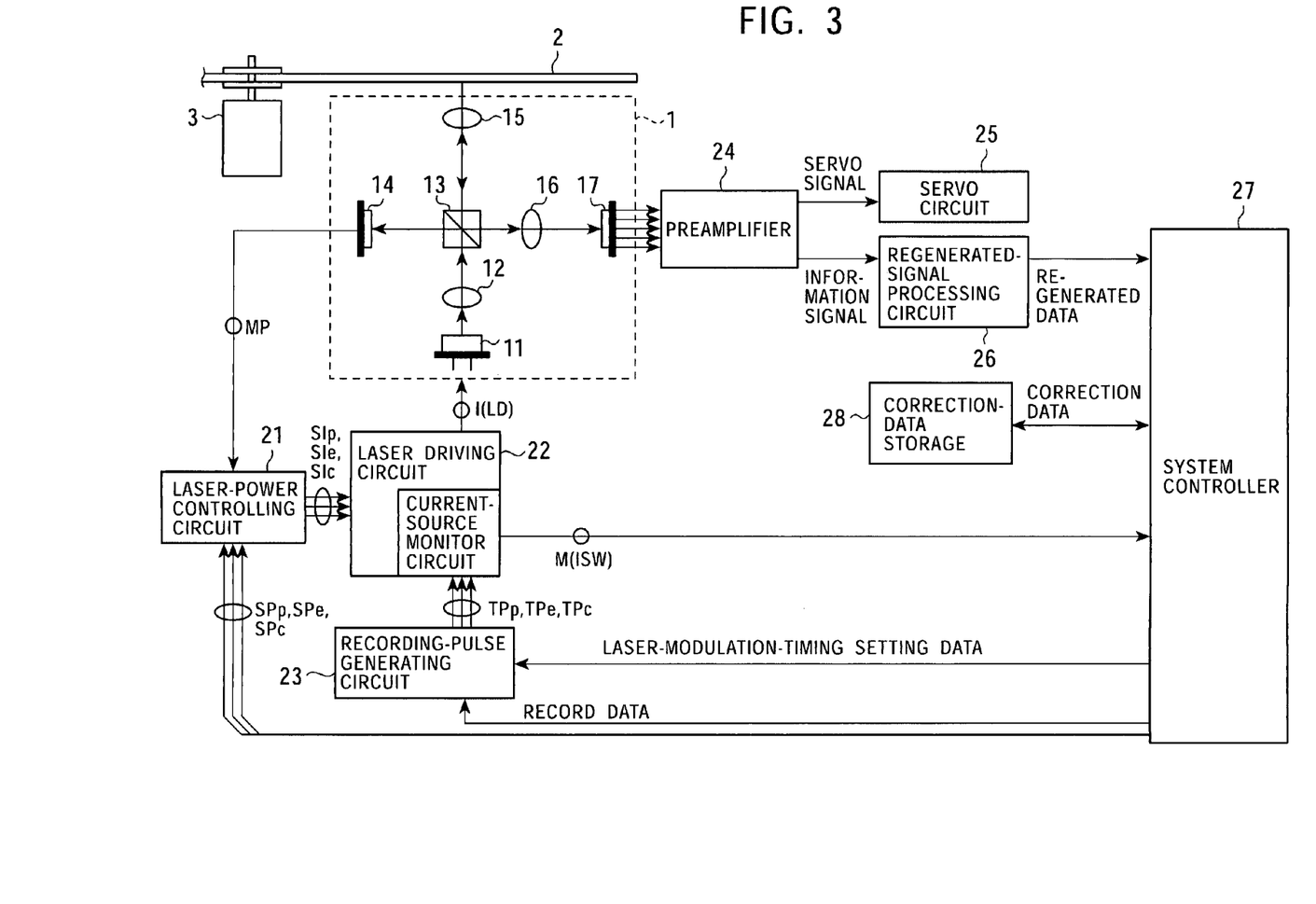
FIG. 3 is a block diagram showing the structure of an optical disc system according to a third embodiment of the present invention.

FIG. 3 is a block diagram showing the structure of the optical disc system according to the third embodiment of the present invention. The optical disc system of the third embodiment differs from the optical disc system of the first embodiment in FIG. 1 in that the laser driving circuit 22 includes a current-source monitor circuit for a switching circuit and that a switching-circuit current-source-monitor signal M(ISW) is transmitted from the current-source monitor circuit to the system controller 27. The correction-data storage 28 stores the relation between the switching-current amplitude and the pulse-position shift as shown in FIG. 11.

In this structure, the system controller 27 acquires the switching-current amplitude from the input switching-circuit current-source-monitor signal M(ISW). The system controller 27 acquires the shift between the laser-modulation timing pulse TPp, TPe, or TPc in the laser driving circuit 22 and the pulse position of the laser driving current I(LD), from the switching-current amplitude and the correction data.

The laser-modulation-timing setting data that has been corrected in accordance with the shift is transmitted to the recording-pulse generating circuit 23 in order to correct the pulse position of the laser driving current I(LD) to desired timing.

An optical disc system according to a fourth embodiment of the present invention will now be described.

Figure 4:
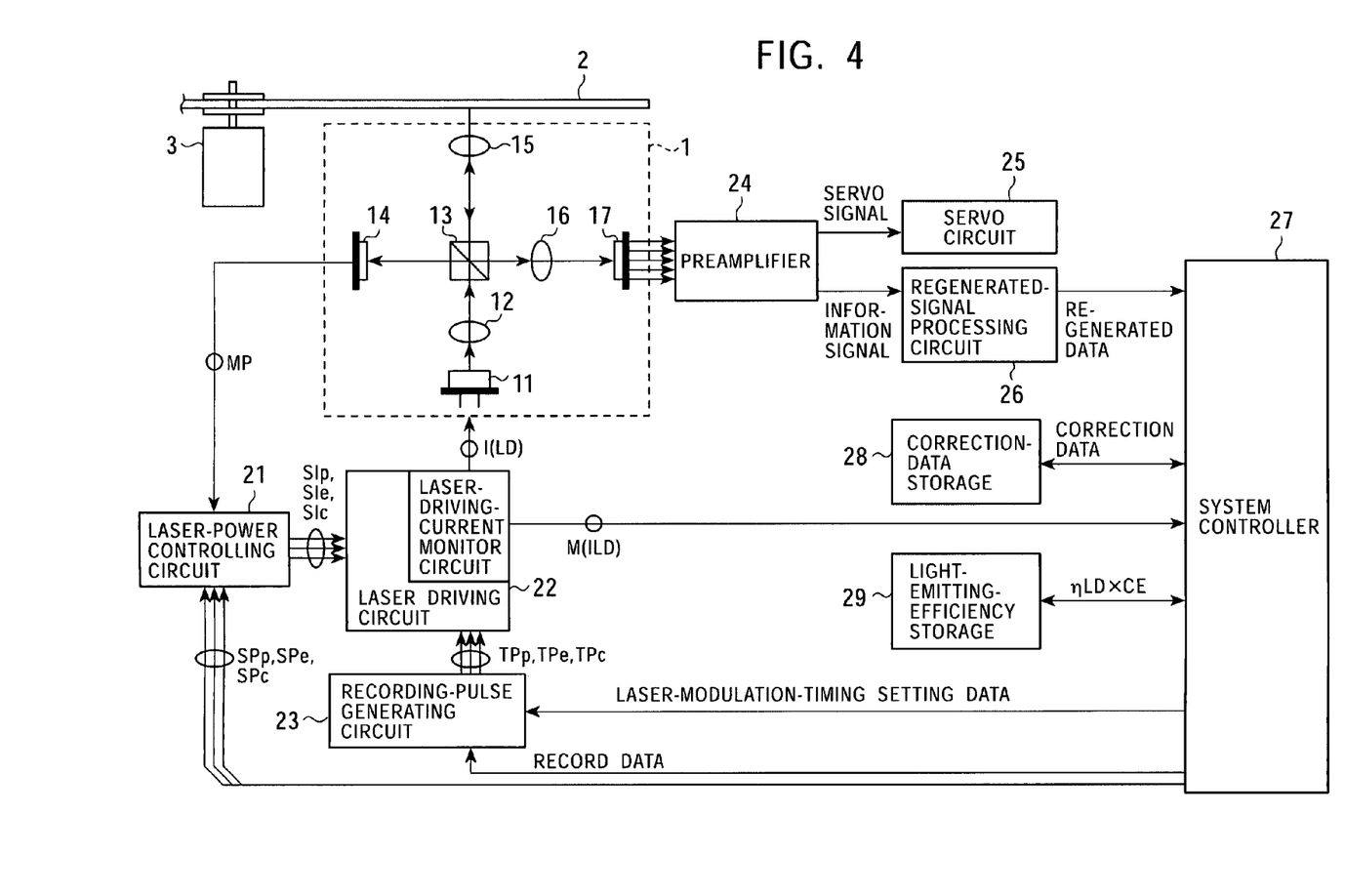
FIG. 4 is a block diagram showing the structure of an optical disc system according to a fourth embodiment of the present invention.

FIG. 4 a block diagram showing the structure of the optical disc system according to the fourth embodiment of the present invention. The optical disc system of the fourth embodiment differs from the optical disc system of the first embodiment in FIG. 1 in that the laser driving circuit 22 includes a laser-driving-current monitor circuit and that the optical disc system further includes a light-emitting-efficiency storage 29. A laser-driving-current monitor signal M(ILD) is transmitted from the laser-driving-current monitor circuit to the system controller 27. The correction-data storage 28 stores the relation between the switching-current amplitude and the pulse-position shift as shown in FIG. 11.

As described above in the Description of the Related Art (2), the switching amplitude ΔP(DISC) of the disc irradiation power is given by equation 1.

$$\Delta P(DISC) = \Delta I(LD) \times \eta LD \times CE \qquad \text{Formula 1}$$

Specifically, storing the measured ηLD×CE in the light-emitting-efficiency storage 29 allows the switching-current amplitude to be acquired from the laser power (setting power) that is supplied from the system controller 27 to the laser-power controlling circuit 21. The shift between the laser-modulation timing pulse TPp, TPe, or TPc in the laser driving circuit 22 and the pulse position of the laser driving current I(LD) is acquired from the switching-current amplitude and the correction data. The laser-modulation-timing setting data that has been corrected in accordance with the shift is transmitted to the recording-pulse generating circuit 23 in order to correct the pulse position of the laser driving current I(LD) to desired timing. The system controller 27 measures ηLD×CE and updates the data in the light-emitting-efficiency storage 29 when the optical disc system is turned on or during idling to acquire the accurate correction data, without being affected by deterioration with age or difference between individual optical discs.

Figure 5:
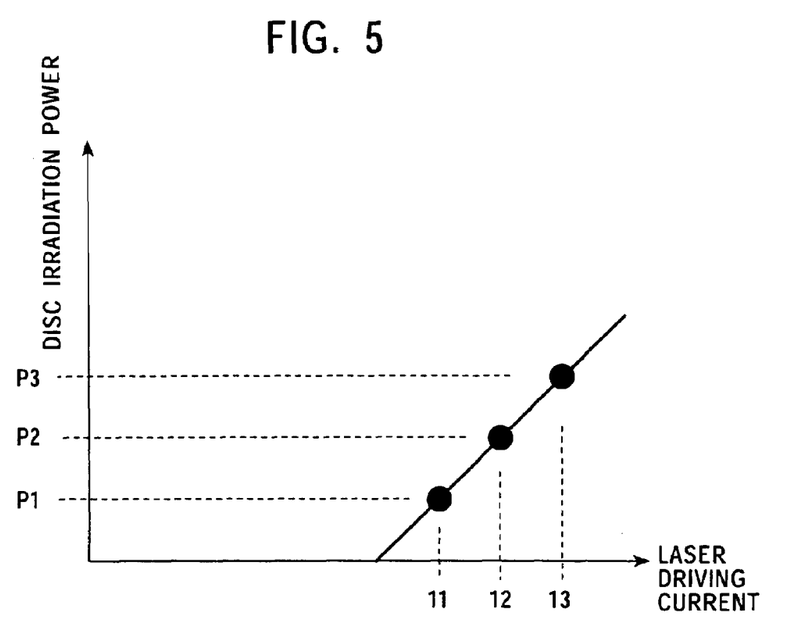
FIG. 5 illustrates a method of measuring $\eta LD \times CE$ in the optical disc system in FIG. 4.

With the structure in FIG. 4, ηLD×CE can be measured by, for example, the method shown in FIG. 5. Referring to FIG. 5, the vertical axis represents the disc irradiation power and the horizontal axis represents the laser driving current. Laser light is emitted at a plurality of light emitting powers P1, P2, P3, . . . corresponding to the laser-power instruction signals SPp, SPe, and SPc, and laser driving currents I1, I2, I3, . . . for the respective powers are measured from the laser-driving-current monitor signal M(ILD) supplied from the laser driving circuit 22. Linearly approximating the measured points produces a gradient, which is equal to ηLD×CE.

As described above, according to the embodiments of the present invention, even when the pulse position of the laser driving current I(LD) is shifted from the timing instructed by the laser-modulation timing pulse, storing the shift in the correction-data storing unit and correcting the laser-modulation timing pulse in advance can correct the shift, thus generating a desired recording pulse and achieving stable recording characteristics.

Even when the rising-edge delay of a pulse depends on the switching-current amplitude, acquiring the switching-current amplitude can generate a desired width of the recording pulse even with the variation in the laser differential efficiency or the optical efficiency in the optical system.

Furthermore, measuring the switching-current amplitude when the optical disc system is turned on or during idling can generate a desired recording pulse without being affected by temperature characteristics or deterioration with age of the laser or the optical system.

While the invention has been described in its preferred embodiments, it is to be understood that the invention is not limited thereto but various changes and modifications may be made without departing from the spirit of the invention.

What is claimed is:

1. An optical disc system, comprising:
   a disc recording unit configured to record an information signal on an optical disc by switching an irradiation power of a laser light to be applied to the optical disc in accordance with the information signal, the disc recording unit including
   a semiconductor laser configured to serve as a light source of the laser light;
   a laser-power controlling circuit configured to output a laser-driving-current instruction signal such that the semiconductor laser emits a predetermined light power;
   a recording-pulse generating circuit configured to generate an appropriate recording pulse in accordance with the information signal to output a laser-modulation timing pulse;
   a laser driving circuit configured to generate a laser driving current in accordance with the laser-driving-current instruction signal and the laser-modulation timing pulse; and
   a correction-data storage configured to store, as correction data, a shift between the laser-modulation timing pulse in the laser driving circuit and a pulse position of the laser driving current; and
   a controller configured to correct the pulse position of the laser driving current to a desired position by correcting a position of the laser-modulation timing pulse with reference to the correction data stored in the correction-data storage.

2. The optical disc system according to claim 1,
wherein the laser driving circuit includes a switching circuit, and
wherein the controller is configured to correct the position of the laser-modulation timing pulse in accordance with a switching-current amplitude of the switching circuit.

3. The optical disc system according to claim 2,
wherein the controller is configured to monitor the laser-driving-current instruction signal to acquire the switching-current amplitude from the laser-driving-current instruction signal.

4. The optical disc system according to claim 2,
wherein the laser driving circuit includes a current-source monitor circuit for the switching circuit, the current-source monitor circuit being configured to monitor a current flowing through a current source of the switching circuit, and
wherein the controller is configured to acquire the switching-current amplitude with the current-source monitor circuit for the switching circuit.

5. The optical disc system according to claim 2,
wherein the laser driving circuit includes a laser-driving-current monitor circuit for monitoring the laser driving current and the disc recording unit includes a light-emitting-efficiency storage for storing a relation between the laser driving current and the irradiation power, and
wherein the controller is configured to determine the relation between the laser driving current and the irradiation power to store the relation in the light-emitting-efficiency storage and to acquire the switching-current amplitude from setting power supplied to the laser-power controlling circuit based on the relation.

6. The optical disc system according to claim 3,
wherein the controller is configured to monitor the switching-current amplitude during a recording operation to correct the position of the laser-modulation timing pulse during the operation.

7. The optical disc system according to claim 4,
wherein the controller is configured to monitor the switching-current amplitude during a recording operation to correct the position of the laser-modulation timing pulse during the operation.

8. The optical disc system according to claim 5,
wherein the controller is configured to set the relation between the laser driving current and the irradiation power when the optical disc system is turned on or during idling and to update the data in the light-emitting-efficiency storage.

9. A control method of an optical disc system, comprising:
a disc recording method for recording an information signal on an optical disc by switching an irradiation power of a laser light to be applied to the optical disc in accordance with the information signal, the disc recording method including
outputting a laser-driving-current instruction signal such that a semiconductor laser, serving as a light source of the laser light, emits a predetermined light power,
generating an appropriate recording pulse in accordance with the information signal to output a laser-modulation timing pulse,
generating a laser driving current in accordance with the laser-driving-current instruction signal and the laser-modulation timing pulse, and
storing, as correction data, a shift between the laser-modulation timing pulse and a pulse position of the laser driving current, in a correction data storage,
wherein the control method includes a correction step of correcting the pulse position of the laser driving current to a desired position by correcting a position of the laser-modulation timing pulse with reference to the correction data stored in the correction-data storage.

10. The control method according to claim 9,
wherein the correction step includes a step of correcting the position of the laser-modulation timing pulse in accordance with a switching-current amplitude of a switching circuit.

11. The control method according to claim 10, further comprising:
monitoring the laser-driving-current instruction signal to acquire the switching-current amplitude from the laser-driving-current instruction signal.

12. The control method according to claim 10,
wherein the step of generating the laser driving current includes obtaining a current flowing through a current source of the switching circuit, and
wherein the control method further includes a step of acquiring the switching-current amplitude from the obtained current flowing through the current source of the switching circuit.

13. The control method according to claim 10, further comprising:
determining the relation between the laser driving current and the irradiation power monitored by a laser-driving-current monitor circuit to store the relation in a storage; and acquiring the switching-current amplitude from setting power supplied to the outputting a laser-driving-current instruction signal step based on the relation.

14. The control method according to claim 11,
wherein the correction step includes a step of monitoring the switching-current amplitude during a recording operation to correct the position of the laser-modulation timing pulse during the operation.

15. The control method according to claim 12,
wherein the correction step includes a step of monitoring the switching-current amplitude during a recording operation to correct the position of the laser-modulation timing pulse during the operation.

16. The control method according to claim 13, further comprising:
setting the relation between the laser driving current and the irradiation power when the optical disc system is turned on or during idling; and
updating the data in the storage.

* * * * *